(12) United States Patent
Suh (10) Patent No.: US 8,195,536 B2
(45) Date of Patent: Jun. 5, 2012

(54) ACTIVITY INFORMATION ACCOUNTING SYSTEM

(76) Inventor: Won-Kyo Suh, Seoul (KR)

( * ) Notice: Subject to any disclaimer, the term of this patent is extended or adjusted under 35 U.S.C. 154(b) by 182 days.

(21) Appl. No.: 12/673,310

(22) PCT Filed: Jul. 30, 2008

(86) PCT No.: PCT/KR2008/004432
§ 371 (c)(1),
(2), (4) Date: Feb. 12, 2010

(87) PCT Pub. No.: WO2009/022800
PCT Pub. Date: Feb. 19, 2009

(65) Prior Publication Data
US 2011/0202435 A1    Aug. 18, 2011

(30) Foreign Application Priority Data
Aug. 13, 2007 (KR) .................. 10-2007-0081316

(51) Int. Cl.
G06F 19/00 (2011.01)
G06F 17/30 (2006.01)
(52) U.S. Cl. .................................... 705/30; 705/24
(58) Field of Classification Search .............. 705/30, 705/33
See application file for complete search history.

(56) References Cited

U.S. PATENT DOCUMENTS

| | | | | |
|---|---|---|---|---|
| 6,330,545 | B1 * | 12/2001 | Suh | 705/30 |
| 2002/0016752 | A1 | 2/2002 | Suh | |
| 2003/0172013 | A1 * | 9/2003 | Block et al. | 705/33 |
| 2003/0212610 | A1 * | 11/2003 | Duffy et al. | 705/26 |
| 2004/0162771 | A1 * | 8/2004 | Tamatsu et al. | 705/30 |
| 2005/0055289 | A1 | 3/2005 | Mehldahl | |
| 2005/0182700 | A1 * | 8/2005 | Suh | 705/32 |
| 2009/0234885 | A1 * | 9/2009 | Yotsukura | 707/104.1 |
| 2010/0153239 | A1 * | 6/2010 | Liebich et al. | 705/30 |

FOREIGN PATENT DOCUMENTS

| | | |
|---|---|---|
| KR | 1020000063786 A | 11/2000 |
| KR | 1020030015708 A | 2/2003 |
| KR | 1020040002457 A | 1/2004 |

OTHER PUBLICATIONS

Sillitti, A., Collecting, Integrating and Analyzing Software Metrics and Personal Software Process Data, Sep. 1-6, 2003, Euromicro Conference, Proceedings, 29th, p. 336-342.*
International Search Report mailed on Jan. 29, 2009 for PCT/KR2008/004432.

* cited by examiner

Primary Examiner — M. Thein
Assistant Examiner — Milena Racic
(74) Attorney, Agent, or Firm — The PL Law Group, PLLC

(57) ABSTRACT

The present invention relates to an activity information accounting system. The system includes a central processing unit 1 for interpreting and executing a program command to perform accounting and processing data, an input unit 2 for inputting activities and resources of a management organization, an auxiliary storage unit 3 for storing an accounting program to execute accounting and storing accounting results of the central processing unit 1 in specific file forms, an output unit 4 for displaying processing results of data by the accounting, an activity table 10 providing activity lists corresponding to the activities, a resources table 20 for, when any one of the activity lists is selected, providing a resources list matching the selected activity list, a table matching unit 30 for matching the selected activity list and its pertinent resources list, and an account title providing unit 50 providing a corresponding account title through matching of the table matching unit 30.

2 Claims, 6 Drawing Sheets

| Activity table |
|---|
| Sales activity list-<br>    merchandise sales activity, product sales activity,<br>    export merchandise sales activity, affiliated company sales activity<br><br>Purchase activity list-<br>    merchandise purchase activity, primary material purchase activity,<br>    secondary material purchase activity<br><br>Expense activity list-<br>    salary activity, supplies expense activity, power expense activity,<br>    transportation expense activity, entertainment expense activity<br><br>Collection activity list-<br>    merchandise account receivable-trade collection activity,<br>    product account receivable-trade collection activity<br><br>Payment activity list-<br>    merchandise account payable-trade payment activity,<br>    primary material account payable-trade payment activity,<br>    accrued supplies expenses payment activity<br><br>Acquisition and disposal activity list of non-current assets-<br>    buildings acquisition activity, buildings disposal activity,<br>    vehicle and transportation equipment acquisition activity,<br>    vehicle and transportation equipment disposal activity<br><br>Investment and financial activity list-<br>    debenture occurrence activity, debenture redemption activity,<br>    common stock capital increase activity<br><br>Settlement activity list-<br>    unexpired insurance bill appropriation activity,<br>    accrued interest appropriation activity,<br>    depreciation expense appropriation activity<br><br>Revenue activity list-<br>    inhabitants tax levy activity, inhabitants tax collection activity,<br>    auto tax levy activity, auto tax collection activity<br><br>Expenditure activity list-<br>    Salary payment activity, vehicle maintenance expenses<br>    inspection activity, vehicle maintenance expenses payment activity |

| Account title |
|---|
| Product sales (+)/cash (+) or (debit) cash/(credit) product sales |
| Product sales (+)/deposit (+) or (debit) deposit/(credit) product sales |
| Product sales (+)/account receivable (+) or (debit) account receivable /(credit) product sales |
| Product sales (+)/advance (-) or (debit) advance (credit) product sales |
| Local tax (+)/local tax receivable (+) or (debit) local tax receivable /(credit) local tax |
| Local tax receivable (-)/cash (+) or (debit) cash/(credit) local tax receivable |

[Fig. 11]

| Activity | Cash flow title |
|---|---|
| Cash product sales | Product sales cash inflow |
| Deposit product sales | Product sales cash inflow |
| Credit product sales | (No) |
| Advance offset product sales | (No) |
| Local tax levy notice | (No) |
| Local tax collection | Local tax cash inflow |

…

ACTIVITY INFORMATION ACCOUNTING SYSTEM

CROSS REFERENCE TO RELATED APPLICATION

This application claims the priority of Korean Patent Application No. 10-2007-0081316, filed on Aug. 13, 2007 in the KIPO (Korean Intellectual Property Office), the disclosure of which is incorporated herein in their entirety by reference. Further, this application is the National Phase application of International Application No. PCT/KR2008/004432, filed Jul. 30, 2008, which designates the United States and was published in English. Each of these applications is hereby incorporated by reference in their entirety into the present application.

TECHNICAL FIELD

The present invention relates to an activity information accounting system in which activity information of a corporate can be entered and necessary accounting reports can be output.

BACKGROUND ART

In general, when so-called transactions occur in business management activities, a so-called bookkeeping work for systemizing and classifying the transactions using a business accounting method is performed.

Figure 1:
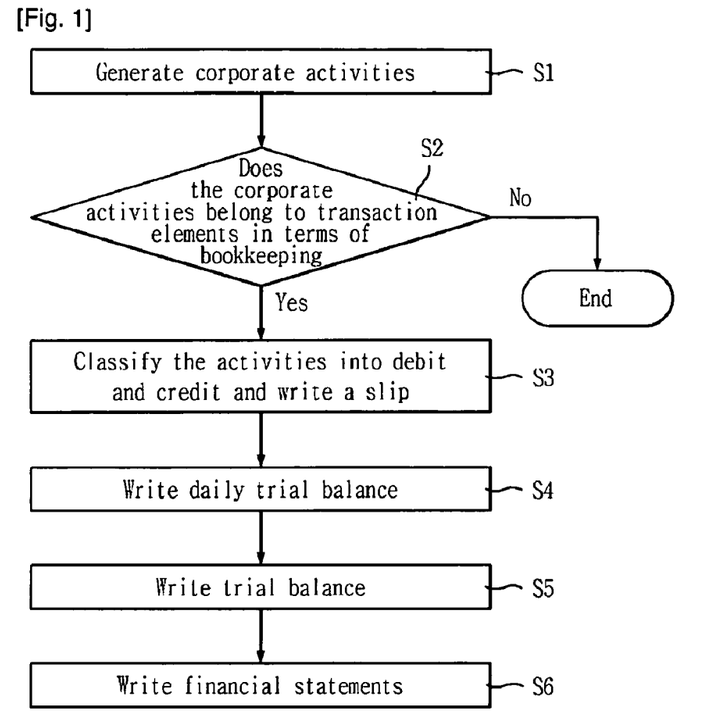
FIG. 1 is a flowchart illustrating a conventional accounting process.

FIG. 1 is a flowchart illustrating a conventional accounting process. As shown in FIG. 1, first, when corporate activities are generated (S1), it is determined whether the corporate activities belong to transaction elements in terms of bookkeeping (S2).

In accordance with a conventional general accounting method, accounting was performed on only corporate activities, which belong to transaction elements in terms of bookkeeping, of corporate activities, but was not performed on corporate activities, which do not belong to transaction elements in terms of bookkeeping.

If, as a result of the determination in step S2, the activities of the corporate belong to the transaction elements in terms of bookkeeping, a journalizing work for classifying the activities of the corporate into debit and credit and writing a slip is performed (S3). The journalizing work refers to a task of classifying activities of a corporate into about 300 account titles and matching the activities of the corporate to respective account titles. More specifically, after the activities of the corporate are largely classified into debit and credit, transaction contents corresponding to an increase of assets, a decrease of liabilities, a decrease of a capital, and the occurrence of expenses are assigned to the debit, and transaction contents corresponding to a decrease of assets, an increase of debit, an increase of a capital, and the occurrence of profits are assigned to the credit.

Meanwhile, in this journalizing work, the sum of debit must be identical to the sum of credit in accordance with a so-called principle of equilibrium. In order to check whether the sum of the debit is identical to the sum of the credit, a daily trial balance for finding the sum of the debit and the sum of the credit of a slip is written daily and a trial balance of finding the sum of the debit and the sum of the credit of is written at specific intervals (for example, monthly) (S4, S5).

Next, financial statements are written on the basis of the contents of the trial balance (S6). Examples of financial statements include a balance sheet indicating financial results of a corporate, and an income statement indicating business performance of a corporate.

Meanwhile, the journalizing process according to the conventional accounting method is performed by largely writing a slip. A person who writes the slip has to know about 300 bookkeeping account titles exactly. Even when the slip process is performed using a data processing apparatus such as a computer, a user has to know the entire account head names and the entire code names representing account titles.

As described above, the conventional bookkeeping work can be performed by only experts who exactly know account titles or account codes. Therefore, the conventional bookkeeping work was performed afterwards by an accounting department having additional expertise without being carried out when all activities of a corporate occur.

Further, even in the case in which account titles are not directly input and accounting is performed through selection of activities and resources, activity information in which activities and resources corresponding to the activities are combined has to be input. Here, a user has to directly search necessary combinations of activities and resources from about 1,000 combinations of activities and resources and input the searched combinations. Accordingly, a problem arose because the processing time was long.

DISCLOSURE OF INVENTION

Technical Problem

Accordingly, the present invention has been made in view of the above problems occurring in the prior art, and an object of the present invention is to provide an activity information accounting system, which facilitates the search and input by employing a combination of a number of activities and four resources, saving the accounting time.

Technical Solution

To achieve the above object, the present invention provides an activity information accounting system, including a central processing unit for interpreting and executing a program command to perform accounting and processing data, an input unit for inputting activities and resources of a management organization, an auxiliary storage unit for storing an accounting program to execute accounting and storing accounting results of the central processing unit in specific file forms, an output unit for displaying processing results of data by the accounting, a selection unit for selecting an activity list and resources list through an input of the input unit, a display unit for displaying the activity list and resources list selected by the selection unit and displaying account titles corresponding to matched an activity list and resources list, through the output unit, a sum input unit for inputting amounts to the account titles displayed on the display unit through an input of the input unit, and a report writing unit for writing a report based on the amounts input by the sum input unit, the system including:

an activity table for providing the activity list, which comprises a large activity list having a sales activity list including small lists of merchandise sales activities, product sales activities, export merchandise sales activities, and affiliated company sales activities, a purchase activity list including small lists of merchandise purchase activities, primary material purchase activities, and secondary material purchase activities, an expense activity list including small lists of salary activities, supplies expense activities, power expense activities, transportation expense activities, and entertainment expense activities, a collection activity list including small lists of merchandise account receivable-trade collection activities and product account receivable-trade collection activities, a payment activity list including small lists of merchandise account payable-trade payment activities, primary material account payable-trade payment activities, and accrued supplies expenses payment activities, an acquisition and disposal activity list of non-current assets including small lists of acquisition activities of buildings, disposal activities of buildings, acquisition activities of vehicle and transportation equipment, and disposal activities of vehicle and transportation equipment, an investment and financial activity list including small lists of occurrence activities of debenture, redemption activities of debenture, and common stock capital increase activities, a settlement activity list including small lists of appropriation activities of unexpired insurance bill, appropriation activities of accrued interest, and appropriation activities of depreciation expense, a revenue activity list including small lists of inhabitants tax levy activities, inhabitants tax collect activities, auto tax levy activities, and auto tax collect activities, an expenditure activity list including small lists of salary payment activities, vehicle maintenance expenses inspection activities, and vehicle maintenance expenses payment activities a resources table for, when any one of the activity lists is selected, providing large resources lists comprising a cash resources list, including small lists of cash resources and deposit resources matching the selected activity list, and a credit resources list, including small lists of credit resources and advance resources a table matching unit for matching the selected activity list and a resources list pertinent to the selected activity list; and an account title providing unit, which provides a cash product sales account title corresponding to product sales (+)/cash (+) or (debit) cash/(credit) product sales when a combination of the activities and the resources is cash product sales, a deposit product sales account title corresponding to product sales (+)/payment (+) or (debit) payment/(credit) product sales when a combination of the activities and the resources is deposit product sales, a credit product sales account title corresponding to product sales (+)/account receivable (+) or (debit) account receivable/(credit) product sales when a combination of the activities and the resources is credit product sales, an advance offset product sales account title corresponding to product sales (+)/advance (−) or (debit) advance/(credit) product sales when a combination of the activities and the resources is advance offset product sales, a local tax levy notice account title corresponding to a local tax (+)/local tax receivable (+) or (debit) local tax receivable/(credit) local tax and a local tax collect account title corresponding to a local tax receivable (−)/cash (+) or (debit) cash/(credit) local tax receivable when a combination of the activities and the resources is a local tax.

As described above, the present invention enables accounting laymen to input activity information of a corporate and can write and output accounting reports.

In this case, transactions performed in profit or nonprofit management organizations are called activities.

Moreover, the names of the activities can be defined in various ways according to the characteristics of management organizations. In the event of profit organizations, the names of the activities can include sales activities, purchase activities, expense activities, collection activities, payment activities, acquisition and disposal activities of non-current assets, investment and financial activities, settlement activities and so on. In the case of nonprofit organizations, the names of the activities can include revenue activities, expenditure activities, settlement activities and so on. Here, the activities can be several tens or several hundreds of activities.

Further, in order for activities to come into exist in management organizations, resources enabling the activities must correspond to the activities. Here, the resources can include cash, deposit, credit (account receivable, account payable), advance (advance from customers, advance payment) and so on in profit organizations, and cash, deposit, credit (account receivable, account payable) and so on in nonprofit organizations.

Advantageous Effects

The present invention is advantageous in that the search and input are facilitated by employing a combination of a plurality of activities and four resources and the accounting time is short.

BRIEF DESCRIPTION OF THE DRAWINGS

Further objects and advantages of the invention can be more fully understood from the following detailed description taken in conjunction with the accompanying drawings in which:

FIG. 6 is a detailed block diagram of the activity table;

MODE FOR THE INVENTION

The present invention will now be described in detail in connection with embodiments with reference to the accompanying drawings.

Figure 2:
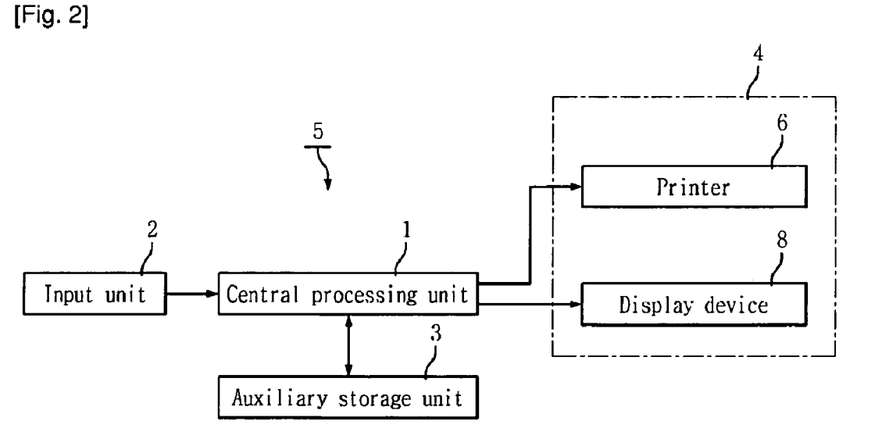
FIG. 2 is a block diagram of an activity information accounting system in accordance with an embodiment of the present invention.

FIG. 2 is a block diagram of an activity information accounting system in accordance with an embodiment of the present invention.

As shown in FIG. 2, an accounting system 5 in accordance with a first embodiment of the present invention includes a central processing unit 1, an input unit 2, an auxiliary storage unit 3 and an output unit 4.

The central processing unit 1 interprets and executes a program command to execute an accounting method in accordance with an embodiment of the present invention. In the central processing unit 1 are included ROM (read only memory) and RAM (random access memory), i.e., storage devices for data processing.

The input unit 2 is adapted to enable a user to input corporate activity data from the outside and includes the keyboard, the mouse, etc. The output unit 4 is adapted to display processing results of data according to the accounting method of an embodiment of the present invention and includes a printer 6 and a display device 8.

The auxiliary storage unit 3 stores a program to perform the accounting method in accordance with an embodiment of the present invention and stores results of the accounting method in accordance with an embodiment of the present invention as specific file forms.

Figure 3:
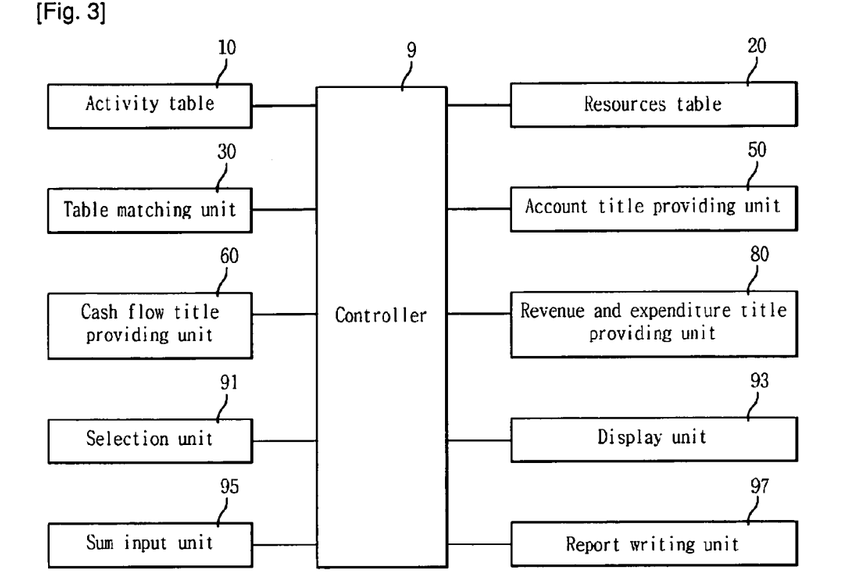
FIG. 3 is a block diagram showing a configuration corresponding major elements of FIG. 2.
Figure 4:
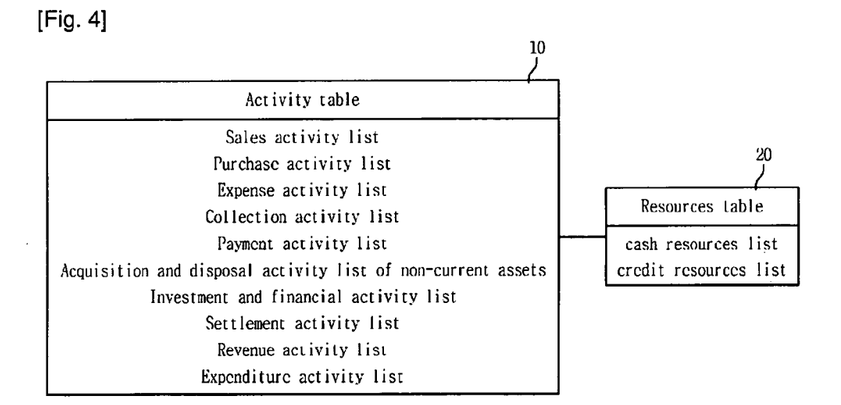
FIG. 4 is a block diagram showing an activity table and a resources table of FIG. 3.
Figure 5:
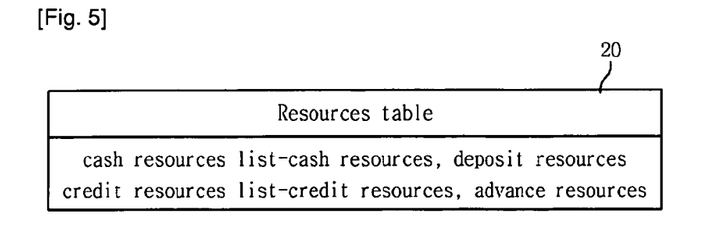
FIG. 5 is a detailed block diagram of the resources table.

FIG. 3 is a block diagram showing a configuration corresponding major elements of FIG. 2. FIG. 4 is a block diagram showing an activity table and a resources table of FIG. 3. FIG. 5 is a detailed block diagram of the resources table. FIG. 6 is a detailed block diagram of the activity table.

As shown in FIGS. 3 to 6, the accounting system 5 of the present invention, including the central processing unit 1 for interpreting and executing a program command to perform accounting and processing data, the input unit 2 for inputting activities and resources of a management organization, the auxiliary storage unit 3 for storing an accounting program to execute accounting and storing accounting results of the central processing unit 1 in specific file forms, and the output unit 4 for displaying processing results of data by the accounting, includes an activity table 10 for providing activity lists for the activities; a resources table 20 for, when any one of the activity lists is selected, providing resources lists matching the selected activity list; a table matching unit 30 for matching the selected activity list and a pertinent resources list; and an account title providing unit 50 for providing corresponding account titles based on the matching of the table matching unit 30.

In this case, a controller 9 controls the respective elements 10, 20, 30, and 50 according to the program.

First, when a user selects any one of the activity lists displayed on the display device 8 included in the output unit 4, resources lists corresponding to the selected activity list is displayed. Moreover, when the user selects any one of the displayed resources lists, account titles are displayed. Here, when the user inputs an amount to each of the account titles, a report is written.

As described above, a user can input activity values and resources values easily and rapidly using the activity table 10 and the resources table 20 that match each other. Accordingly, a corresponding report can be written rapidly. Here, the activity table 10 and the resources table 20 are made to match each other by the table matching unit 30.

The activity lists provided by the activity table 10 preferably includes large activity lists, such as a sales activity list, a purchase activity list, an expense activity list, a collection activity list, a payment activity list, an acquisition and disposal activity list of non-current assets, an investment and financial activity list, a settlement activity list, a revenue activity list and an expenditure activity list. The resources lists provided by the resources table 20 preferably include large resources lists such as a cash resources list and a credit resources list.

In this case, the activity lists can include about 10 activity lists, and the resources lists can include about two resources lists. At this time, the number of the activity and resources lists can be adjusted arbitrarily, and a smaller number or a larger number of the activity and resources lists can be included.

The sales activity list includes small lists of merchandise sales activities, product sales activities, export merchandise sales activities, and affiliated company sales activities. The purchase activity list includes small lists of merchandise purchase activities, primary material purchase activities, and secondary material purchase activities. The expense activity list includes small lists of salary activities, supplies expense activities, power expense activities, transportation expense activities, and entertainment expense activities. The collection activity list includes small lists of merchandise account receivable-trade collection activities and product account receivable-trade collection activities. The payment activity list includes small lists of merchandise account payable-trade payment activities, primary material account payable-trade payment activities, and accrued supplies expenses payment activities. The acquisition and disposal activity list of non-current assets includes small lists of acquisition activities of buildings, disposal activities of buildings, acquisition activities of vehicle and transportation equipment, and disposal activities of vehicle and transportation equipment. The investment and financial activity list includes small lists of occurrence activities of debenture, redemption activities of debenture, and common stock capital increase activities. The settlement activity list includes small lists of appropriation activities of unexpired insurance bill, appropriation activities of accrued interest, and appropriation activities of depreciation expense. The revenue activity list includes small lists of inhabitants tax levy activities, inhabitants tax collect activities, auto tax levy activities, and auto tax collect activities. The expenditure activity list includes small lists of salary payment activities, vehicle maintenance expenses inspection activities, and vehicle maintenance expenses payment activities.

Moreover, the cash resources list preferably includes small lists of cash resources and deposit resources. The credit resources list preferably includes small lists of credit resources and advance resources.

In this case, each of the ten large activity lists is comprised of a plurality of small activity lists and includes 250 small activity lists in total. Moreover, two of the ten large resources lists comprise four small resources lists.

Accordingly, a user can select any one of the ten large activity lists and selects any one of the two large resources lists. Next, the user selects any one of the plurality of small activity lists belonging to the selected large activity list and select any one of two small resources lists belonging to the selected large resources list.

As described above, the present invention enables the activities and resources to be selected through two-step selection process, so that the process of selecting the activities and resources can be performed rapidly and easily.

In this case, the activity table 10 and the resources table 20 are made to match to each by the table matching unit 30. Here, the table matching unit 30 matches the small lists in order of the small lists in the large lists of the activity table 10 and the resources table 20.

The accounting system 5 of the present invention preferably further includes a selection unit 91 for selecting the activity lists and the resources lists through an input of the input unit 2 a display unit 93 for displaying the activity lists and resources lists selected by the selection unit 91 and displaying account titles corresponding to matched activity lists and resources lists, through the output unit 4 a sum input unit 95 for inputting amounts to the account titles displayed on the display unit 93 through an input of the input unit 2 and a report writing unit 97 for writing a report based on the amounts input by the sum input unit 95.

In this case, the controller 9 controls the respective elements 91, 93, 95 and 97.

As described above, the present invention can be used to input amounts to corresponding account titles and write reports using the respective elements 91, 93, 95 and 97.

Here, the report is a financial result report and a business performance report.

Figure 7:
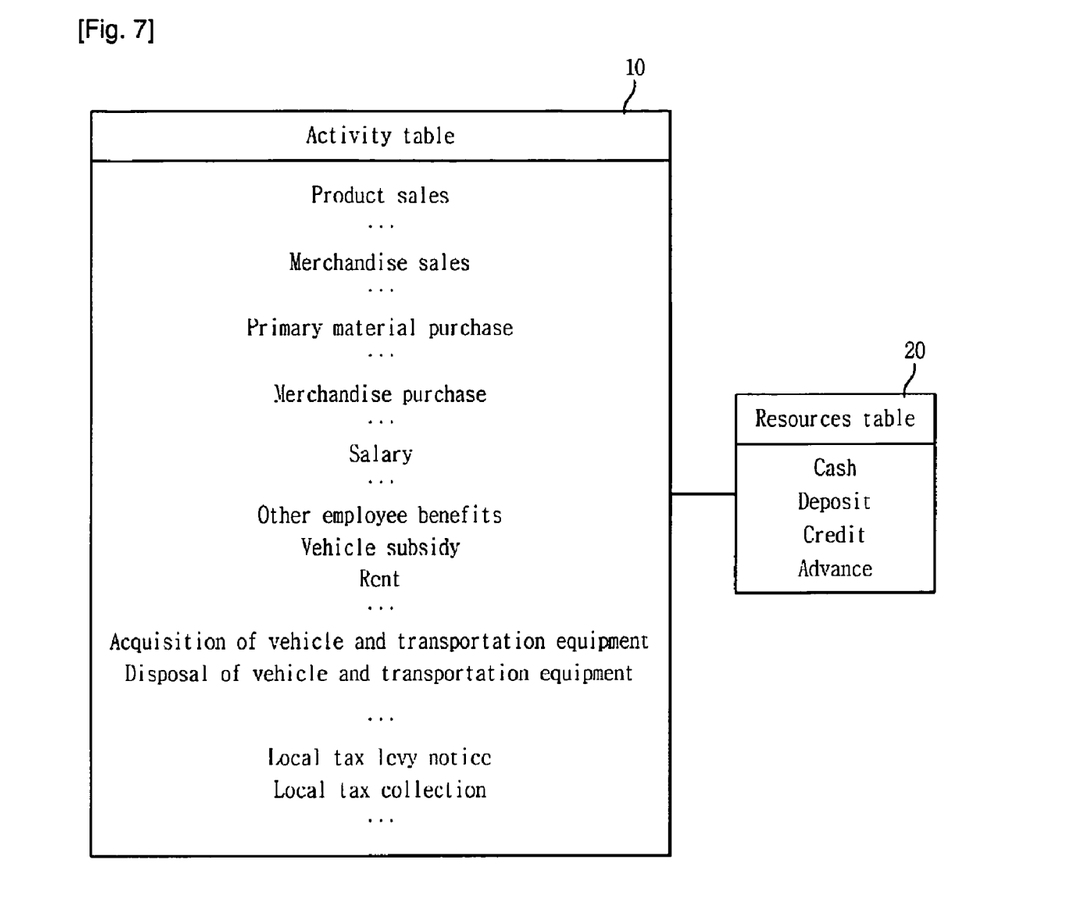
FIG. 7 is a block diagram showing another embodiment of the activity table and the resources table.

Meanwhile, FIG. 7 is a block diagram showing another embodiment of the activity table and the resources table.

As shown in FIG. 7, the activity lists of the activity table 10 can include 250 in number, and the resources lists of the resources table 20 can include four in number. Here, if the 250 activities and the four resources are selected, they can be combined. Accordingly, a user can select the activities and resources rapidly through once step.

Figure 8:
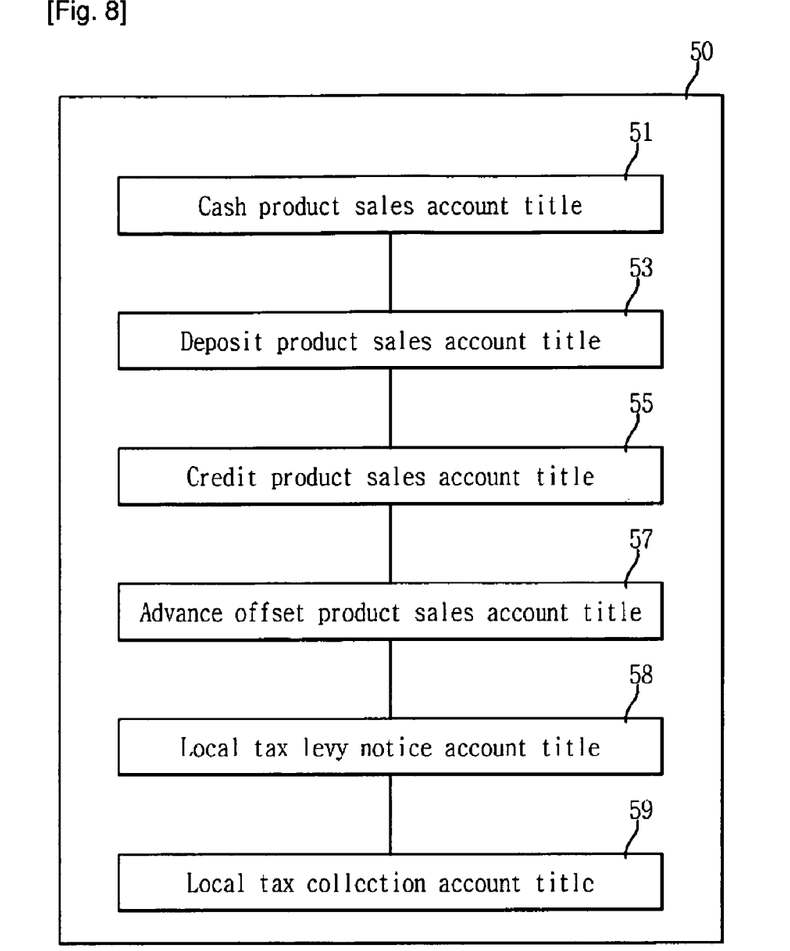
FIG. 8 is a detailed block diagram of an account title providing unit of FIG. 3.
Figure 9:
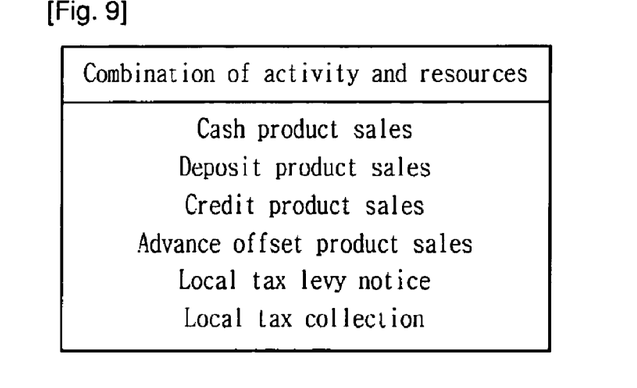
FIG. 9 shows an example of a combination of activities and resources of FIG. 4.
Figure 10:
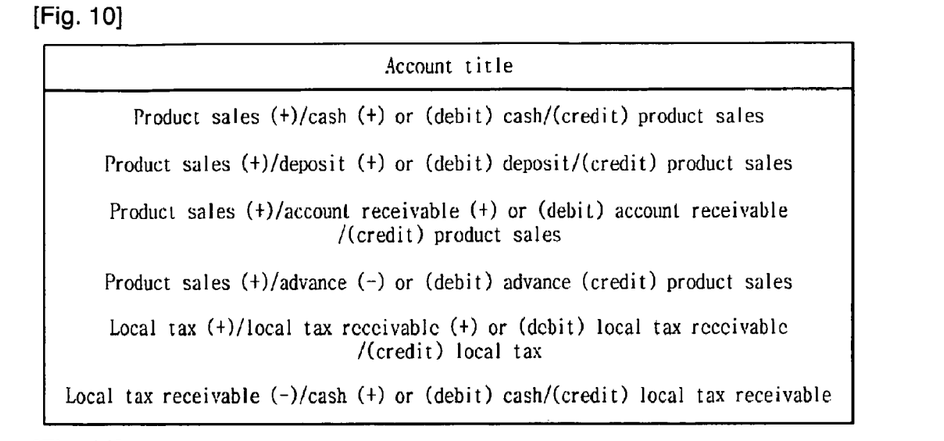
FIG. 10 is a diagram showing account heading displayed by a combination of activities and resources selected through an account title providing unit.

FIG. 8 is a detailed block diagram of the account title providing unit of FIG. 3. FIG. 9 shows an example of a combination of activities and resources of FIG. 4. FIG. 10 is a diagram showing account heading displayed by a combination of activities and resources selected through the account title providing unit.

As shown in FIGS. 8 to 10, the account title providing unit 50 preferably includes a cash product sales account title 51 corresponding to product sales (+)/cash (+) or (debit) cash/(credit) product sales when a combination of the activities and the resources is cash product sales, a deposit product sales account title 53 corresponding to product sales (+)/deposit (+) or (debit) deposit/(credit) product sales when a combination of the activities and the resources is deposit product sales, a credit product sales account title 55 corresponding to product sales (+)/account receivable (+) or (debit) account receivable/(credit) product sales when a combination of the activities and the resources is credit product sales, and an advance offset product sales account title 57 corresponding to product sales (+)/advance (−) or (debit) advance (credit) product sales when a combination of the activities and the resources is advance offset product sales.

In this case, (debit), that is, debit and (credit), that is, credit indicates an increase and decrease of the account titles. When the assets and expense account titles are displayed in the debit, the account titles are increased. When the assets and expense account titles are displayed in the credit, the account titles are decreased. When the account titles of liabilities, capital and profits are displayed in the debit, the account titles are decreased. When the account titles of liabilities, capital and profits are displayed in the credit, the account titles are increased.

As described above, the present invention can write a financial result report and a business performance report using the account title providing unit 50.

The account title providing unit 50 preferably further includes a local tax levy notice account title 58 corresponding to a local tax (+)/local tax receivable (+) or (debit) local tax receivable/(credit) local tax and a local tax collect account title 59 corresponding to local tax receivable (−)/cash (+) or (debit) cash/(credit) local tax receivable when a combination of the activities and the resources is a local tax.

Moreover, in the account title providing unit 50, the respective titles 51, 53, 55, 57, 58, and 59 are stored in the auxiliary storage unit 3 in data forms such as the account titles of FIG. 10 through a program.

Further, the tax revenues expenditure lists of the local tax levy notice account title 58 and the local tax collect account title 59 include a local tax, etc. Here, the activity lists can include a local tax levy notice, a local tax collect and so on. Here, tax revenues and expenditure information related to the local tax can be known through an input of activity information called local tax collect.

As described above, according to the present invention, a report corresponding to revenue and expenditure can be written through the local tax levy notice account title 58, the local tax collect account title 59 and the report writing unit 97 by inputting the activity lists and the resources lists.

Figure 11:
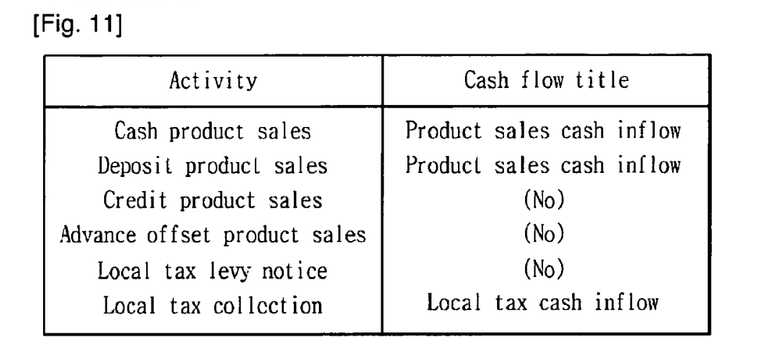
FIG. 11 is a diagram showing cash flow titles that match a combination of activities and resources.

FIG. 11 is a diagram showing cash flow titles that match a combination of the activities and the resources.

As shown in FIG. 11, a cash flow title providing unit 60 having cash flow lists, helping to write a cash flow title corresponding to a combination of an activity list and a resources list matched by the table matching unit 30 can be preferably further included.

In this case, the cash flow lists of the cash flow title providing unit 60 can include product sales inflow, etc.

As described above, according to the present invention, a cash flow report can be written through the table matching unit 30, the cash flow title providing unit 60, and the report writing unit 97 by selecting the activity lists and the resources lists.

Although the specific embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An activity information accounting system, comprising: a controller comprising:

a central processing unit for interpreting and executing a program command to perform accounting and processing data, an input unit for inputting activities and resources of a management organization, an auxiliary storage unit for storing an accounting program to execute accounting and storing accounting results of the central processing unit in specific file forms, an output unit for displaying processing results of data by the accounting, a selection unit for selecting an activity list and resources list through an input of the input unit, a display unit for displaying the activity list and resources list selected by the selection unit and displaying account titles corresponding to matched an activity list and resources list through the output unit, a sum input unit for inputting amounts to the account titles displayed on the display unit through an input of the input unit, and a report writing unit for writing a report based on the amounts input by the sum input unit;

an activity table providing the activity list, which comprises a large activity list having a sales activity list including small lists of merchandise sales activities, product sales activities, export merchandise sales activities, and affiliated company sales activities, a purchase activity list including small lists of merchandise purchase activities, primary material purchase activities, and secondary material purchase activities, an expense activity list including small lists of salary activities, supplies expense activities, power expense activities, transportation expense activities, and entertainment expense activities, a collection activity list including small lists of merchandise account receivable-trade collection activities and product account receivable-trade collection activities, a payment activity list including lists of merchandise account payable-trade activities, primary material account payable-trade payment activities, and accrued supplies expenses payment activities, an acquisition and disposal activity list of non-current assets including lists of acquisition activities of buildings, disposal activities of buildings, acquisition activities of vehicle and transportation equipment, and disposal activities of vehicle and transportation equipment, an investment and financial activity list including small lists of occurrence activities of debenture, redemption activities of debenture, and common stock capital increase activities, a settlement activity list including small lists of appropriation activities of unexpired insurance bill, appropriation activities of accrued interest, and appropriation activities of depreciation expense, a revenue activity list including small lists of inhabitants tax levy activities, inhabitants tax collect activities, auto tax levy activities, and auto tax collect activities, and an expenditure activity list including small lists of salary payment activities, vehicle maintenance expenses inspection activities, and vehicle maintenance expenses payment activities;

a resources table, when any one of the activity lists is selected, provides large resources lists comprising a cash resources list, including small lists of cash resources and deposit resources matching the selected activity list, and a credit resources list, including small lists of credit resources and advance resources;

a table matching unit for matching the selected activity list and a resources list pertinent to the selected activity list; and an account title providing unit, which provides a cash product sales account title corresponding to product sales (+)/cash (+) or (debit) cash/(credit) product sales when a combination of the activities and the resources is cash product sales, a deposit product sales account title corresponding to product sales (+)/deposit (+) or (debit) deposit/(credit) product sales when a combination of the activities and the resources is deposit product sales, a credit product sales account title corresponding to product sales (+)/account receivable (+) or (debit) account receivable/(credit) product sales when a combination of the activities and the resources is credit product sales, an advance offset product sales account title corresponding to product sales (+)/advance (−) or (debit) advance (credit) product sales when a combination of the activities and the resources is advance offset product sales, a local tax levy notice account title corresponding to a local tax (+)/local tax receivable (+) or (debit) local tax receivable/(credit) local tax and a local tax collect account title corresponding to a local tax receivable (−)/cash (+) or (debit) cash/(credit) local tax receivable when a combination of the activities and the resources is a local tax.

2. The activity information accounting system of claim 1, further comprising a cash flow title providing unit having cash flow lists, helping to write a cash flow title corresponding to a combination of an activity list and a resources list matched by the table matching unit.

* * * * *